(12) United States Patent
Spiegelman

(10) Patent No.: US 7,376,489 B1
(45) Date of Patent: May 20, 2008

(54) METHOD OF IDENTIFYING FLUID PURIFICATION EQUIPMENT WHICH IS OPTIMIZED FOR INDIVIDUAL FLUID PURIFICATION SYSTEMS

(75) Inventor: Jeffrey J. Spiegelman, La Jolla, CA (US)

(73) Assignee: Entegris, Inc., Chaska, MN (US)

( * ) Notice: Subject to any disclaimer, the term of this patent is extended or adjusted under 35 U.S.C. 154(b) by 936 days.

(21) Appl. No.: 09/661,617

(22) Filed: Sep. 14, 2000

(51) Int. Cl.
G05B 21/00 (2006.01)
G05B 13/02 (2006.01)
G05B 10/00 (2006.01)
G06F 19/00 (2006.01)
G06Q 30/00 (2006.01)

(52) U.S. Cl. .................. 700/271; 700/32; 700/175; 700/266; 700/273; 700/95; 700/97; 700/106; 137/1; 706/46; 706/47; 703/1; 705/1; 705/26; 436/174; 436/177; 436/178

(58) Field of Classification Search .............. 700/32, 700/175, 271, 273, 266, 95, 97, 106; 137/1; 62/147; 703/18; 705/1, 26; 423/1; 706/902, 706/904, 912, 46, 47, 919, 920, 932; 436/174, 436/177, 178
See application file for complete search history.

(56) References Cited

U.S. PATENT DOCUMENTS

| | | | | |
|---|---|---|---|---|
| 5,315,521 A * | 5/1994 | Hanson et al. | ............... | 700/103 |
| 5,666,297 A * | 9/1997 | Britt et al. | ..................... | 703/18 |
| 5,732,397 A * | 3/1998 | DeTore et al. | ................. | 705/1 |
| 5,873,263 A * | 2/1999 | Chang | ......................... | 62/617 |
| 5,960,411 A * | 9/1999 | Hartman et al. | .............. | 705/26 |
| 6,041,263 A * | 3/2000 | Boston et al. | ................ | 700/32 |
| 6,173,210 B1 * | 1/2001 | Bjornson et al. | ............. | 700/99 |
| 6,182,275 B1 * | 1/2001 | Beelitz et al. | .............. | 717/175 |
| 6,241,955 B1 * | 6/2001 | Alvarez, Jr. | ................ | 423/210 |
| 6,629,008 B2 * | 9/2003 | Shiiba et al. | ............... | 700/100 |

* cited by examiner

Primary Examiner—Brian Sines
(74) Attorney, Agent, or Firm—Hamilton, Brook, Smith & Reynolds, P.C.

(57) ABSTRACT

An interactive method and apparatus are disclosed through which a fluid purification system operator inputs the system's parameters and the method then identifies one or more fluid purification equipment packages which will be optimized at the component level to the operator's specific requirements. The invention includes a relational database containing data on fluid purification equipment, the components thereof and ancillary equipment, and associated operational software to which the operator gains access through a computer and which then presents to the operator a series of questions relevant to gas purification equipment and system requirements. The questions are such that the responses elicited from the operator for each question determine what the successive questions will be and what optimal components will be identified. The software and databases may be in memory on the computer, embodied on CDs or DVDs run by the computer, or accessed through the Internet.

28 Claims, 1 Drawing Sheet

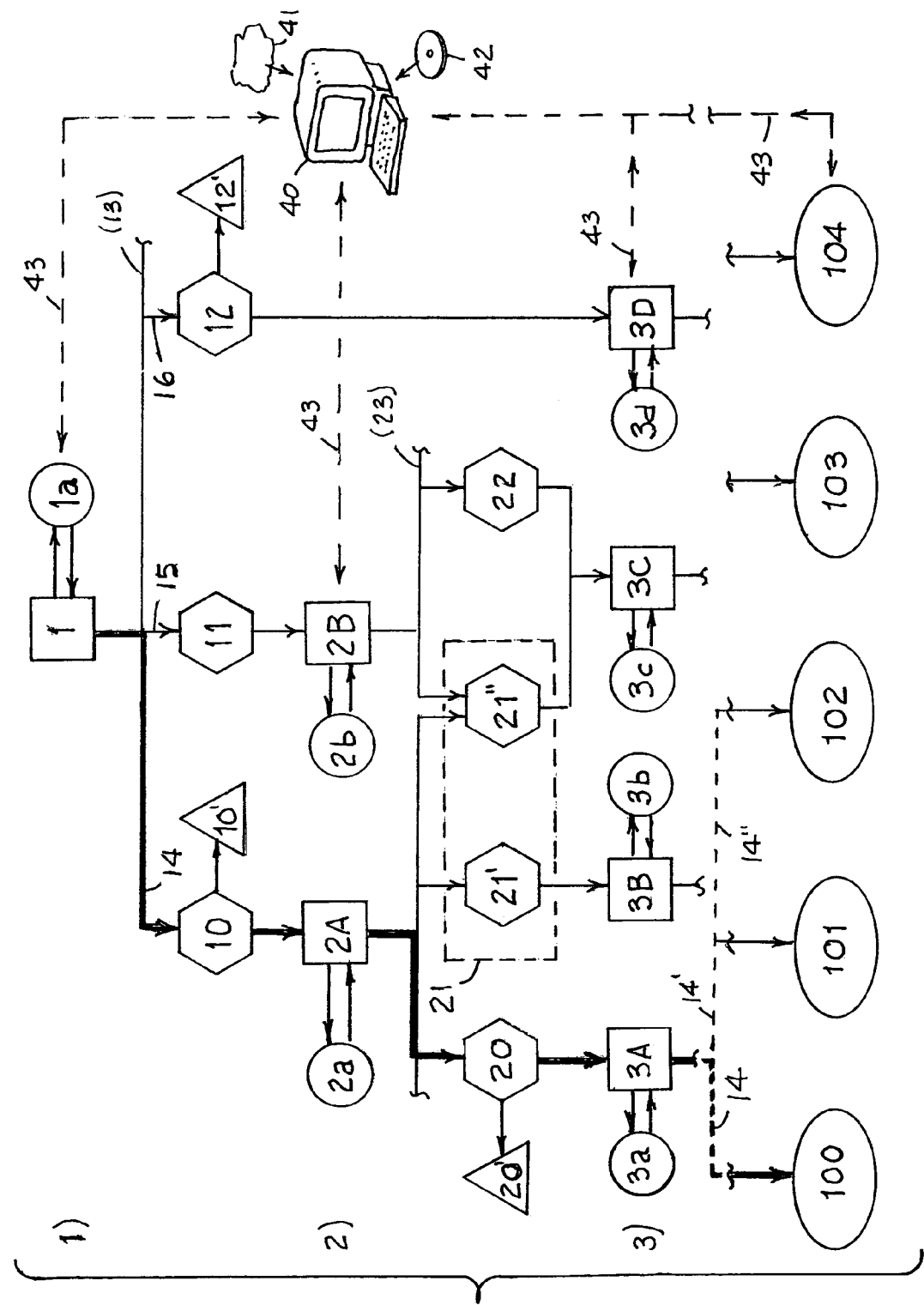

METHOD OF IDENTIFYING FLUID PURIFICATION EQUIPMENT WHICH IS OPTIMIZED FOR INDIVIDUAL FLUID PURIFICATION SYSTEMS

BACKGROUND OF THE INVENTION

1. Field of the Invention

The invention herein relates to equipment used for fluid (i.e., gas, liquid or mixed gas and liquid) purification. More specifically it relates to methods for identifying such equipment which is optimal for use in an particular fluid purification system.

2. Description of the Prior Art

There are many processes in industry which involve fluid purification. These include processes in which reactant materials are deposited from fluid streams and processes in which fluids are used to remove impurities from surfaces of materials. The degree of purity which is necessary for a particular fluid stream will depend upon the use to which the fluid stream is to be put, but in many cases it is necessary to purify the fluid to a level at which the contaminant concentration in the fluid is at the parts per million (ppm) or parts per billion (ppb) level.

There are numerous types of fluid purification equipment available in the marketplace. However, notwithstanding the different types of equipment available, operators of fluid purification processes often find that the selection of available commercial "off the shelf" devices does not provide a device which is particularly suitable for the unique nature of an operator's particular process. Consequently in the past operators of fluid purification processes have often been faced with the choice of using a market-priced, commercial piece of equipment which may be acceptable but is not ideal for the process or of having to have an expensive custom piece of equipment designed specifically for the process.

Those prior art pieces of equipment were originally available for selection through catalogs. The process operator examined catalogs from several vendors and selected the piece of commercial equipment that came closest to what would be useful in the his or her process. The vendor's sales personnel might be available to assist with the operator's selection, but the end result was still selection of a standard piece of equipment, with little or no accommodation to the operator's particular process. With the advent of the Internet, vendors have in effect been able to put their catalogs online, so that operator using the Internet can select an available piece of fluid purification equipment at the price that the operator is willing to pay. The Internet has also allowed vendors to replace the indexing system of typical catalog with a data input system which allows the operator to enter representative parameters of his or her process and then the vendor's software identifies the closest commercial product available from that vendor. Such systems, however, whether in printed catalogs or on the Internet are still at the level of end products. The operator must therefore determine which properties of the end product he or she is willing to compromise on to obtain other components which are closer to optimal for the process of interest. An operator who is faced with only a limited number of available commercial products may have no choice but to accept equipment with, for instance, poor corrosion resistance in order to obtain, for instance, the desired range of fluid flow rates through the equipment. This is a result of the lack of prior art methods and software which would allow an operator specify or obtain a device which would be optimum for the particular fluid purification process in question on a component-by-component basis.

Another current problem for operators is that effectively they can only access information and order equipment during the regular working day, since they must normally interact directly with vendors' personnel to obtain quotes, discuss product selection, etc. Even where the operator has a vendor's catalogue, they can do little more than get a preliminary idea of what they might need from the catalogue, and must still work directly with the vendor's personnel to develop the full equipment and cost package. This is a particular problem if a vendor is located in a different time zone from the operator. Of course this also means that vendors must maintain substantial staffs of personnel to work with the operators to develop such packages, since the catalogues alone do not enable operators to determine for themselves what equipment is appropriate for their systems, and the catalogues certainly do not allow an operator to custom design a system specifically to meet his or her needs.

It would therefore the advantageous if a method were available through which a fluid purification process operator could specify in detail the applicable parameters of his or her process and which would then result in specification of components which when assembled would be specifically adapted to be used in the operator's process in an optimal manner. It would also be advantageous for that system to be fully available to an operator at all times.

SUMMARY OF THE INVENTION

The present invention overcomes the limitations of the prior art by presenting to an operator of a fluid purification system an interactive method by which the operator can identify the significant parameters of his or her system and the method of the present invention will identify for the operator a component-level-based fluid purification equipment package which will be optimized at the component level to the operator's specific requirements. The operator is thus enabled to identify that combination of components which, when assembled, can be operated in a matter to provide, in his or her system, optimal fluid purification, taking into account many variables including fluid type, flow rate, contaminant challenge, and required output fluid purity. For the purposes of this invention, "fluid" will include any one or more of gases, liquids, mixtures of each and mixtures of gases and liquids together. "Gases" also includes "vapors." "Purification" includes fluid filtration and liquid or gas regeneration systems. The fluid purification or decontamination processes to which the invention is applicable can be those which reduce contamination to any degree, including those where contaminant reduction levels are down to the parts per million or parts per billion ranges.

For brevity herein, the invention will often be exemplified in the discussion below as a gas purification system. It will be understood, however, that unless the context indicates otherwise, the discussion is equally applicable to determination of components for liquid and liquid/gas purification systems.

The central aspect of the invention is a relational database containing data on all pertinent aspects of fluid purification equipment and the components thereof, and associated operational software to which the operator gains access through a computer and which then presents to the operator a series of questions relevant to fluid purification equipment and system requirements. The content and order of presentation of the questions is such that the answers elicited from the operator for each question determine what the successive questions will be. At each level of question the system of this invention uses the operator's answers to identify appropriate portions of the database and identifies and selects data from those portions directly related to the operator's indicated requirements and/or identified the next successive path segments through the interactive sequence of questions most applicable to the operator's indicated requirements.

The net result is that, at the end of the sequence of questions and answers, the method of the invention generates from the optimized components identified and selected, a complete fluid purification equipment package for the operator's consideration, which is optimized specifically for the operator's particular system requirements. Since the owner and provider of the method, database and software of the invention will normally also be a vendor of fluid purification equipment, the system operator will also usually be able to purchase the designated equipment from the vendor at the conclusion of the operator's use of the method of the invention.

The operator is thus able to determine, quickly and easily, and with the most current data, what equipment will best suit the requirements of his or her fluid purification system, and also to obtain such equipment, customized to those requirements at the equipment component level. The operator will therefore no longer be required to accept predesigned equipment which, while perhaps having a few optimal aspects, will also have other aspects which are not only not optimal, but which may in fact be detrimental to overall optimal system performance. Additionally, the vendor does not need to maintain large personnel staffs, since the operators themselves can optimize their own packages and place their own orders, and can do so at any convenient time and wherever they may be. It also allows operators to consider and compare all available components and combinations, from distant as well as local vendors.

Therefore, in a principal embodiment the invention herein involves a method for identifying fluid purification equipment which is optimized for use in a particular fluid purification system, which comprises providing a database of specifications regarding a plurality of equipment components from which selection of individual components may be made; providing access to the database through an interactive interface of an operating system comprising a series of sequential inquiries, response to each of which determines a next inquiry to be posed or a component to be specified, the inquiries eliciting defining information regarding the particular fluid purification system; and using the defining information to identify those of the components which, when assembled to form the fluid purification equipment in a manner specific to the particular fluid purification system, can be operated so as to optimize fluid purification in the particular fluid purification system.

In another principal embodiment, the invention involves apparatus comprising electronic media for identifying fluid purification equipment which is optimized for use in a particular fluid purification system. The media provides a database of specifications regarding a plurality of equipment components from which selection of individual components may be made. Access to the database through an interactive interface of an operating system comprising a series of sequential inquiries, response to each of which determines a next inquiry to be posed or a component to be specified, with the inquiries eliciting defining information regarding the particular fluid purification system. The defining information is used to identify those of the components which, when assembled to form the fluid purification equipment in a manner specific to the particular fluid purification system, can be operated so as to optimize fluid purification in the particular fluid purification system.

Other embodiments and aspects will be evident from the detailed description below.

BRIEF DESCRIPTION OF THE DRAWING

The single FIGURE of the drawings is a schematic flow chart illustrating the present invention and a representative example of its use.

DETAILED DESCRIPTION AND PREFERRED EMBODIMENTS

There are a number of important parameters in fluid purification systems. These include the physical and chemical properties of the fluid, the contaminants in the fluid and the materials from which the purification equipment or device is made. They also include the operating conditions under which the fluid purification will take place, including operating conditions such as fluid pressure, fluid temperature, fluid flow rate through the equipment, inlet contaminant challenge (i.e., the contaminant load of the incoming fluid), the desired service life of the equipment (i.e., the time between scheduled maintenance intervals), the outlet purity required for the decontaminated fluid and the duty cycle (i.e., the percentage of time that the system will be operating, measured in units such as hours per week). In addition, since the fluid purification equipment operates in the context of a larger system such as a power plant or a chemical plant, it is also important to specify the properties of the interconnecting fittings that the equipment must have in order to connect to the rest of the larger system. Not only can all of these parameters vary widely from system to system, but many of them are also interrelated. For instance, if the incoming contaminant load is large and the desired outlet fluid purity is high, it will usually be necessary to operate the equipment at a relatively low fluid flow rate in order to provide sufficient residence time within the equipment for the contaminants to be removed down to the desired outlet purity level. Similarly, removal of a high contaminant load down to a low level also usually means a relatively short service life and frequent maintenance periods, especially if the duty cycle is high.

The present invention is applicable to all types of fluid purification systems and all of the various fluids used in such systems. These will include fluids which are relatively inert, such as the noble gases, nitrogen, liquid water and water vapor; fluids which may be acidic, caustic or otherwise corrosive, such as the halogen gases or strong liquid acids or alkalis; and fluids which have other properties which require special attention, including oxidizing gases such as oxygen and flammable or explosive gases such as hydrogen or light gaseous and liquid hydrocarbons. It will be evident of course that the different types of fluids commonly require different types of fluid purification equipment, and it is a principal characteristic of this invention that its use allows an operator to prescribe and obtain equipment optimal for use with the particular fluid at issue, no matter whether its properties are benign or aggressive.

Similarly, the present invention is applicable to fluid purification systems regardless of what type of fluid impurity or contaminant is present in the system. The invention can accommodate and specify a particulate filtration component as well as a component that separates entrained liquids from a gas stream or dissolved or dispersed gases from a liquid stream, and also components such as adsorbents which separate gaseous contaminants from a main gas stream.

Central to the present invention is an overall relational database which contains all of the relevant information on the various components which can be part of a fluid purification system, along with information regarding the interconnection of these various components. This database will contain information, for instance, regarding all of the applicable gas adsorbents which can be used to separate gaseous contaminants from a main gas stream, various gas/liquid separation devices to separate gases from a target liquid or vice versa, various materials from which the equipment can be manufactured and the various fluids which an operator may wish to purify. Similarly, the database will contain information regarding various types of pipe and tubing fittings, applicable flow rate data and flow resistance data. Because of the relational nature of the database, the various data included can be interrelated to each other based on the fluid purification equipment requirements defined by the operator/user of the database during the interactive question/answer performance of the invention.

The database will also preferably include data on the operational context of the fluid purification system. This will permit the system to offer to the operator the ability to include in the selection criteria ancillary equipment to be used with the selected fluid purification equipment. Such ancillary equipment may include such things as process control instrumentation and devices, types of piping and valving to allow interconnection with adjacent equipment, desirable upstream or downstream devices such as particulate matter filtration devices to remove particulates from the fluid before the fluid is purified of non-particulate matter in the operator's fluid purification system, and the like.

The data to be included in the database are well-known and well understood to those skilled in the art of gas purification, since these are the various parameters and data that such persons have been working with and have been familiar with for many years. The present invention does not require new types of data, although such databases are capable of accepting new data as they become available, and incorporating those new data into the relational framework of the database. Rather the essence of the present invention is that it makes these data available and accessible to operators in a manner and that allows them to specify and obtain the optimum combination of the various components to assemble gas purification equipment which will be optimized in all components for an operator's particular process.

The invention accomplishes this objective by applying to the database a software inquiry system which poses a series of predetermined questions to an operator regarding his or her gas purification requirements and from the step-by-step answers elicited from the operator selects the various components which when combined will be optimized gas purification equipment for the operator's specific process. The operator is therefore able to obtain gas purification equipment which is optimized at the component level rather than being forced to choose between vendors' end products, each of which is likely to have only a few, and definitely not all, of its components optimized for the operator's own particular gas purification requirements.

There are a number of different relational database software programs available commercially which are capable of presenting a user (i.e., the operator) with a series of structured, predetermined questions and a list of acceptable answers for each question, and from the answer selected by the user for each question be able to search the database and select information (i.e., in this case component identification) which are most responsive to the user's answers. The specific descriptions and details, of such software therefore do not need to be described in detail in this specification. In any event it will be the owner of the database which provides the software and the software itself will be essentially transparent to the user. The user, having logged on to the software/database system of the present invention, will simply encounter a series of interactive screens or Web site pages which pose the applicable questions seriatim and use the answers individually or in combination to retrieve from the database identification of the components which, when combined, will result in the specification of gas purification equipment which will provide overall optimum performance in the system specified by the operator in response to the interactive questions from the software.

The method of the present invention can then be understood best reference to the FIGURE of the drawing. The FIGURE illustrates the first three steps and the final results in a typical operator/user interaction with the software and database by which the present invention identifies optimized gas recovery equipment for the invention user. Starting first at the top of the diagram of the FIGURE, the operator after having logged into the system through his or her computer 40 (either by the Internet 41 or through hard media 42 such as a CD) is presented with a first question 1 as indicated at 43. The question 1 will be accompanied on the computer 40 through the Internet interface 41 or CD 42 with a list of acceptable answers, and the operator/user will be required to indicate his or her answer 1a from that list of answers. Once the answer 1a is elicited and transmitted by to the system, also as indicated at 43, the software initiates a step-by-step search through the database to identify one or more portions of the database relevant to that answer and identify information (e.g., individual component information and specifications) which is most responsive to the answer 1a selected. The FIGURE illustrates how the difference acceptable answers 1a to question 1 lead to separate paths 14, 15, 16, . . . in which are performed searches of different portions 10, 11, 12, . . . (13) . . . of the database. Each of these portions of information may be considered to be "subdatabases" of the main database. Each of the various answers 1a to the question 1 will lead to one of the subdatabases 10, 11, etc. For example, in many cases the first question to be posed to the operator/user by present method will be to identify the specific gas which is to be purified. Specification of a noble gas such as argon may, for example, start the process down one path 14, whereas if the answer 1a identified a corrosive gas, that could start the process down a second path 15 or 16, and so forth. Different selections of answers to a question may also lead to the same path; for instance, if acceptable selections from the list of answers 1a include argon, neon, or helium, all may lead to path 14 since all are noble gases.

Regardless of which path ends up being selected by the answer 1a, a result of accessing the subdatabases 10, 11, etc. may be a search that will identify a particular designation of information 10', 12', Designation of information such as 10' may be of a specific component of gas purification equipment, a specific type of material to be used for the equipment, or any other information which is responsive to the answer 1a elicited from the operator. It is also contemplated that in some cases the designation of information 10', . . . may be negative information, in that for example it may be identification of equipment, materials, or the like which will not be suitable in the operator's system, and which will thereafter be excluded from consideration (e.g., inclusion in answer lists) by the system. Alternatively, as with subdatabase 11, the response generated by the answer 1a may simply be to identify the start of the path 15, and that the access to subdatabase 11 is intended not to generate a search at this level but rather to begin the focus of the method on a final selection of gas purification equipment which will be defined in part by the parameters of subdatabase 11.

The method of the present invention, having completed the first step, then moves to a second level and presents the operator/user with a second question 2a, 2b, . . . . Because the question posed at level 2 is dependent upon the subdatabase 10, 11, etc. to which the software was directed by the answer 1a at level 1 of the questions, questions 2a and 2b will not necessarily be the same question, and in fact may be quite different questions. Even if questions 2a and 2b are the same question, the list of acceptable answers that each presents to the operator may be the same, may be entirely different, or may have some of the same answers and some different answers. For instance, if as in the example mentioned above the question 1 on identification of a specific gas led to an "inert gas" path 14 or a "corrosive gas" path 15, and the second question 2 called for identification of a specific material from which applicable gas purification equipment might be made, the list of acceptable answers 2a would be expected to be longer than the list of acceptable answers 2b, although many if not all of the answers in the list 2b would also be on the list 2a, but not vice versa.

The system then proceeds as described above respect to a second level of subdatabases 20, 21, 22, . . . (23) . . . . In the FIGURE in this level is also illustrated as having subdatabase 21 made up of two portions 21' and 21". The FIGURE at this level also illustrates that the particular response 2a may lead to any of the subdatabases 20, 21', or 21", while a response 2b may lead to subdatabases 21" or 22. At each level, as illustrated for this level 2, the step may include a subdatabase search such as at 20 which leads to identification of information 20', . . . , or merely to identification of the parameters of the particular level 2 subdatabase, as was described above with respect to subdatabase 11. (The specific responses or searches therefore need not be specifically shown for the other subdatabases 21 and 22.)

Thereafter the system moves on to pose questions at level 3 as indicated at 3A, 3B, 3C and 3D, each of which elicits respective answers 3a, 3b, 3c or 3d. Illustrated in the FIGURE at this level is that two different subdatabases (here illustrated as 21" and 22) may lead to the same question at the next level. Also illustrated this level is that the next question following a particular subdatabase such as 12 does not necessarily occur at next level, but may skip levels as indicated at question 3D and answer 3d. For instance, if the path 16 from question 1 were defined for explosive gases, and the second level of questions did not relate to explosion hazards, the system would bypass that level for path 16 and go directly to the third level (or wherever the next level with a relevant question occurred).

It is also contemplated that the system may include provisions which allow for custom design of specific components. For instance, an inquiry could be designed to offer choices of several vendor-specified embodiments of a particular component and also a choice of an operator-specified embodiment. If the operator responded that he or she wanted to specify the properties of the component, the system could list the various component parameters from which the operator could select an unique specification. The system could then determine if the combination specified by the operator was feasible (e.g., that the operator had not specified incompatible parameters), and if so, formulate a quote of the cost for the vendor to produce the custom component. The operator could then confirm or cancel the request.

Similarly, the method of the invention includes a compatibility function in the software to analyze responses to the inquiries and to present notice to the operator when a series of responses results in possible selection of incompatible components. While for the most part the software anticipates and avoids such results, by using the responses to earlier questions to determine what response choices are made available for subsequent questions, not all responses or results can be anticipated in advance. Therefore when an incompatibility is identified by the software, the operator will be notified by an on-screen warning, and will be requested to respecify the affected components or elements thereof. If desired, the software can allow be designed to present to the operator one or more alternative choices which would avoid the incompatibility.

Ultimately through a series of additional questions and answers as exemplified by the extended path 14 (identified by the wide line in the FIGURE), enough information has been determined from the operator's answers to the questions that the relational system can present the operator with at least one fully compiled and interrelated package of information 10', 20', etc. which defines a fluid purification equipment system 100 which is optimized for the operator's process. It will be recognized that optimization is a function of numerous factors, including technical, environmental and economic factors. Thus an operator may actually consider that there can be several possible "optimum" fluid purification systems for the operator's specific needs, depending on the weight given to the different factors. The present invention therefore includes the function that the inquiries and operator's responses can generate more than one such package, when the database operational software identifies components that fit the operator's needs but differ in their technology or economics. For instance, if the operator specifies that purification of the fluid down to a 1 ppm contaminant level is acceptable, the system may generate two possible component combinations, both of which meet this criterion, but where one has higher cost but greater contaminant reduction than the other, and the operator can then choose between them. Thus, as exemplified in the drawing, the system through 14' and 14" could generate alternative component combinations 101 and 102, in addition to combination 100, so that the operator could choose among them based on his or her choice of what functions or features should be given greater weight. For instance, using the above example, one operator might decide that the higher cost system was optimum since it allowed for a wider range of product contaminant loads while another operator faced with the same choice might decide that the other combination was optimum since it performed adequately at lower cost.

Similarly, other paths through the system, as defined by other answers given at various levels by other operators, will lead to other gas purification equipment systems 103, 104 and so forth, which are optimized for those operator's requirements based on their unique inputs of information.

It will be understood that the FIGURE is diagrammatic and that in any given embodiment of the present invention the sequence of questions, the lists of acceptable answers, and the particular relational software-derived paths may be different. While as indicated, a specific question presented at one level will be dependent upon the answers given at previous levels, which in turn have defined the particular path leading to the level of the specific question, in many cases a sequence of questions may be presented as a matter of convenience rather than necessity. For example, a question related to operating conditions such as gas temperature or pressure may precede or follow a question related to the identification of the gas itself. Specific questions may cause paths to diverge as indicated following question 2B and subsequently converge as indicated at question 3C, since in many cases two or more questions and answers are needed to fully identify a component and the order in which the relevant parameters are established is not important. It will also be understood that the diagramed FIGURE does not necessarily represent a particular algorithm used by a particular software program which is being used to search the database. It is not necessary that software be structured in the form of "levels" but rather may use well-known computer architecture techniques such as sequences of subroutines to schedule and present questions and to act upon answers. It will be recognized that the invention resides in the concept of integrating a series of interactive questions and answers with related database and/or subdatabase searches which allow optimization of the gas recovery equipment selection on a component basis rather than simply directing an operator/user to a non-optimized product of predetermined design.

The media through which the method of the present invention is presented to the operator for use may be any appropriate electronic medium, including but not limited to hard media 42 such as the computer 40's internal memory hard drive or interactive CD-ROMs or DVD-ROMs accessed through readers therefor integrated into the computer 40 or access through the global interactive computer network 41 (i.e., the Internet). It is contemplated that the latter, the Internet and associated Web site(s), will be the preferred medium of presentation. Selection of gas purification equipment is for most process operations not a frequent event, and therefore most are reluctant to invest in hard media which may be used only once in a number of years, and in which some of the included data may become obsolete during the long intervals between use. Therefore is it anticipated that most operators will want to access the Internet Web site or sites which present the method of this invention. Such operators will thus obtain the information they need without having to make a long-term purchase of hard media, and will be assured of having the most current information, since the owner/manager of the database will keep it updated on a regular basis.

The system is designed such that the operators of the fluid purification systems themselves can access the information directly. It is also designed for use by local representatives of component supply companies working directly with those purification system operators who do not wish to use the invention develop an entire package on their own. To this end the databases in the system, whether on hard media or at the Internet Web site, will contain all information about the various components and ancillary equipment that an operator or representative may need to make appropriate responses to the inquiries and selections when choices are offered by the system. Thus, for instance, the databases will include data such as full component and component combination descriptions and documentation, purchase prices, anticipated costs of operation, environmental effects, interconnectability with ancillary equipment, and so forth. It will also contain necessary pricing information and preferably will include a function which will generate and display to the operator and representative a running total of component costs, so that inquiries can be repeated and responses modified or changed based on cost considerations.

The system can be operated on many different kinds of computers, including but not limited to desktop computers, laptop computers and Internet-access-specific computers. Especially for vendors' field representatives and system operators who are themselves frequently away from their offices, it is desirable to use laptop computers and to have the databases and operating software on CD's or DVDs or maintained on the computer's hard drive, so that the system may be accessed and used at any time and in any locale. Of course, having the system accessible over the Internet also makes it available at any time of day or night and at any locale where Internet access is available. Since many computers are now equipped for wireless access to the Internet, availability of the system is extensive. In either case the operator is no longer limited to obtaining information or making selections only during a vendor's working hours, and a representative is not limited to meeting with customers only when directly access to a home office for information is possible. Further, the Internet information can be updated immediately upon any changes in component availability, cost, features, etc., so that one accessing the system over the Internet has the most current information. Provision can also be made for operators and representatives to download updates to their own computers and incorporate the new information directly into the program copies in their computers' memories or to supplement previously received CDs or DVDs. CDs and DVDs can also be updated on a frequent schedule and distributed, in a manner which provides much more currency of the information than has previously been available from vendors' catalogues, since catalogues require much more time and expense to update, reprint and distribute.

It will be evident that there are numerous embodiments of the present invention which are not expressly described above, but which are clearly within the scope and spirit of the invention. The above description is therefore to be considered exemplary only, and the actual scope of the invention is to be defined solely by the appended claims.

I claim:

1. A method for identifying fluid purification equipment which is optimized for use in a particular fluid purification system, which comprises computer implemented steps of:

providing a relational database of specifications regarding a plurality of fluid purification equipment components;

through an interactive interface, receiving user responses to a series of sequential inquiries, said inquiries piecewise eliciting from a user a set of defining information regarding said particular fluid purification system, each subsequent inquiry in the series being dependent on user responses to previous inquiries in the series, the set of defining information including operating parameters of said particular fluid purification system;

from across the whole series of sequential inquiries, forming the set of defining information from received user responses; and using said formed set of defining information, searching specifications of said database in a manner that automatically identifies for the user a fluid purification equipment package in its entirety that is formed of a resultant set of one or more of the plurality of fluid purification equipment components from the specifications in the database, the resultant set of one or more identified components capable of being assembled to form fluid purification equipment in a manner specific to said particular fluid purification system as set forth by the set of defining information and operated to substantially satisfy the operating parameters therein for optimized fluid purification, the automatic identification of the fluid purification equipment package being performed in a manner free of user selection from and interaction with lists of individual components in the interactive interface.

2. A method as in claim 1 further comprising at least one of said operating parameters being selected from the group consisting of fluid type, fluid flow rate, inlet fluid contaminant challenge, outlet fluid purity, duty cycle, life span between service, fluid temperature, fluid pressure, cost and connections to upstream and downstream portions of said particular fluid purification system.

3. A method as in claim 1 wherein said database comprises a plurality of subdatabases, each subdatabase comprising selection information regarding at least one property of at least one said component of said fluid purification equipment.

4. A method as in claim 3 wherein a series of said responses to inquiries through said interface causes said operating system to compile a series of component selections from said plurality of subdatabases, which components will, when assembled, form said fluid purification equipment which can be operated so as to optimize fluid purification in said particular fluid purification system.

5. A method as in claim 4 further comprising causing said subdatabases to be addressed sequentially, a sequence of addressing being determined at each step in said sequence by said response elicited in an immediately prior step.

6. A method as in claim 4 wherein compilation of said series of component selections further causes said operating system to generate a subsequent series of inquiries regarding choice of equipment ancillary to said fluid purification system.

7. A method as in claim 6 wherein said equipment ancillary to said fluid purification system comprises fluid flow, process control and instrumentation equipment.

8. A method as in claim 3 wherein said selection information of at least one of said subdatabases comprises data for evaluating from said responses whether a defined component currently is available in the marketplace and if not what design and manufacture costs of said defined component would be.

9. A method as in claim 3 wherein said selection information of at least one of said subdatabases comprises data for evaluating from said responses whether combinations of defined components are operationally compatible and presenting a notification thereof.

10. A method as in claim 9 further comprising said notification including suggesting options for alternative compatible combinations.

11. A method as in claim 1 further comprising said using said defining information to identify a plurality of combinations of said components, wherein each combination of said plurality can be assembled to form said fluid purification equipment in a manner specific to said particular fluid purification system and can be operated so as to optimize fluid purification in said particular fluid purification system.

12. A method as in claim 11 wherein said combinations of said components differ from each other with respect to technical and economic parameters, and said method further comprises generating a further inquiry response to which indicates selection among said combinations of a specific combination of said technical and economic parameters most suitable for obtaining optimized fluid purification in said particular fluid purification system.

13. A method as in claim 1 wherein said fluid comprises a liquid, a gas or a mixture thereof.

14. A method as in claim 13 wherein purification of said liquid, gas or mixture comprises removal of contaminants to a level in a parts per million or parts per billion range.

15. A method as in claim 13 wherein purification of said liquid, gas or mixture comprises absorption, separation or filtration.

16. A method as in claim 1 further comprising gaining access to said relational database by means of a computer or through a global computer network.

17. Apparatus comprising electronic media comprising embodiment of the method of claim 1 in a form accessible for interactive use.

18. Apparatus as in claim 17 further comprising said embodiment comprising a relational database and operational software therefor.

19. Apparatus as in claim 18 wherein said relational database comprises a plurality of subdatabases, each subdatabase comprising selection information regarding at least one property of at least one said component of said fluid purification equipment.

20. Apparatus as in claim 19 wherein said selection information of at least one of said subdatabases comprises data for evaluating from said responses whether combinations of defined components are operationally incompatible and presenting a notification thereof.

21. Apparatus as in claim 18 further comprising accessability to said relational database and operational software therefor being by means of a computer.

22. Apparatus as in claim 21 where said relational database and operational software therefore are maintained on and accessible from said interactive storage media disposed within said computer.

23. Apparatus as in claim 22 wherein said interactive storage media comprises a memory hard drive, a CD-ROM or a DVD-ROM.

24. Apparatus as in claim 21 wherein said computer comprises a desktop computer, a laptop computer or an Internet-access-specific computer.

25. Apparatus as in claim 17 wherein said electronic media comprises a global computer network.

26. Apparatus as in claim 25 further comprising said embodiment comprising a relational database and operational software therefore, with accessability thereto being through an Internet Web site on said global computer network.

27. A method for identifying fluid purification equipment which is optimized for use in a particular fluid purification system, the method comprising the computer implemented steps of:

providing a relational database of specifications regarding a plurality of fluid purification equipment components;

through an interactive interface receiving user responses to a series of sequential inquiries, said inquiries piecewise eliciting a set of defining information regarding said particular fluid purification system, each subsequent inquiry in the series being dependent on user responses to previous inquiries in the series, the set of defining information including operating parameters of said particular fluid purification system;

from across the received user responses, obtaining the set of defining information;

using said obtained set of defining information, accessing the database and automatically identifying for a user a fluid purification equipment package in its entirety, said fluid purification equipment package being formed of a resultant set of one or more of the plurality of fluid purification equipment components from the specifications in the database, the resultant set of one or more identified components capable of being assembled to form fluid purification equipment in a manner specific to said particular fluid purification system according to the set of defining information and operated to substantially satisfy the operating parameters therein for optimized fluid purification, the automatic identification of the fluid purification equipment package being performed in a manner free of user selection from and interaction with lists of individual fluid purification equipment components in the interactive interface; and providing an option to purchase said automatically identified fluid purification equipment package.

28. A computer-implemented method for identifying fluid purification equipment which is optimized for use in a particular fluid purification system, which comprises:

providing a relational database of specifications regarding a plurality of fluid purification equipment components;

through an interactive interface, providing a series of sequential inquiries to a user, each subsequent inquiry in the series being dependent on user responses to previous inquiries in the series, said series piecewise eliciting a body of defining information regarding said particular fluid purification system, the body of defining information including operating parameters of said particular fluid purification system;

receiving user responses to the series of sequential inquiries and therefrom forming said body of defining information; and using said formed body of defining information to retrieve specifications from the database and therefrom automatically identifying for a user one or more fluid purification equipment packages each in its entirety, each identified fluid purification equipment package being formed of a respective resultant set of one or more of the plurality of fluid purification equipment components from the specifications in the database, the resultant set of one or more identified components capable of being assembled to form fluid purification equipment in a manner specific to said particular fluid purification system as defined by the body of defining information and operated to substantially satisfy the operating parameters therein for optimized fluid purification, the automatic identification of the fluid purification equipment packages being performed in a manner free of user selection from and interaction with lists of individual fluid purification equipment components in the interactive interface.

* * * * *